United States Patent Office 3,249,936
Patented May 3, 1966

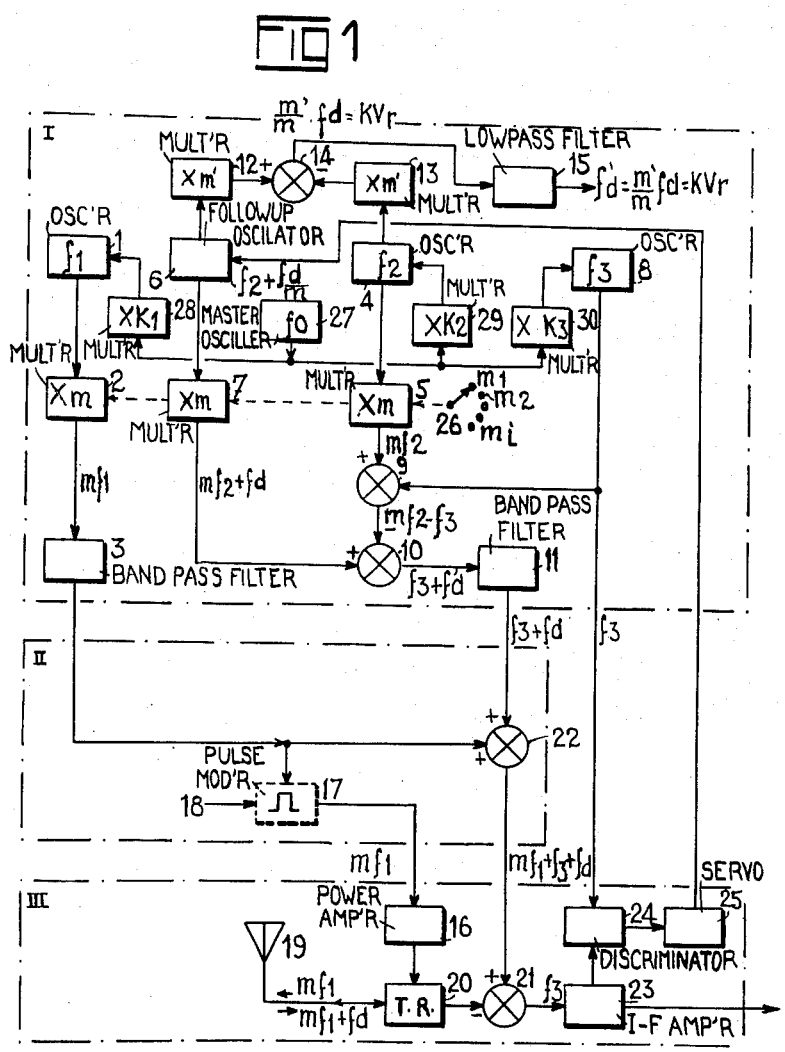

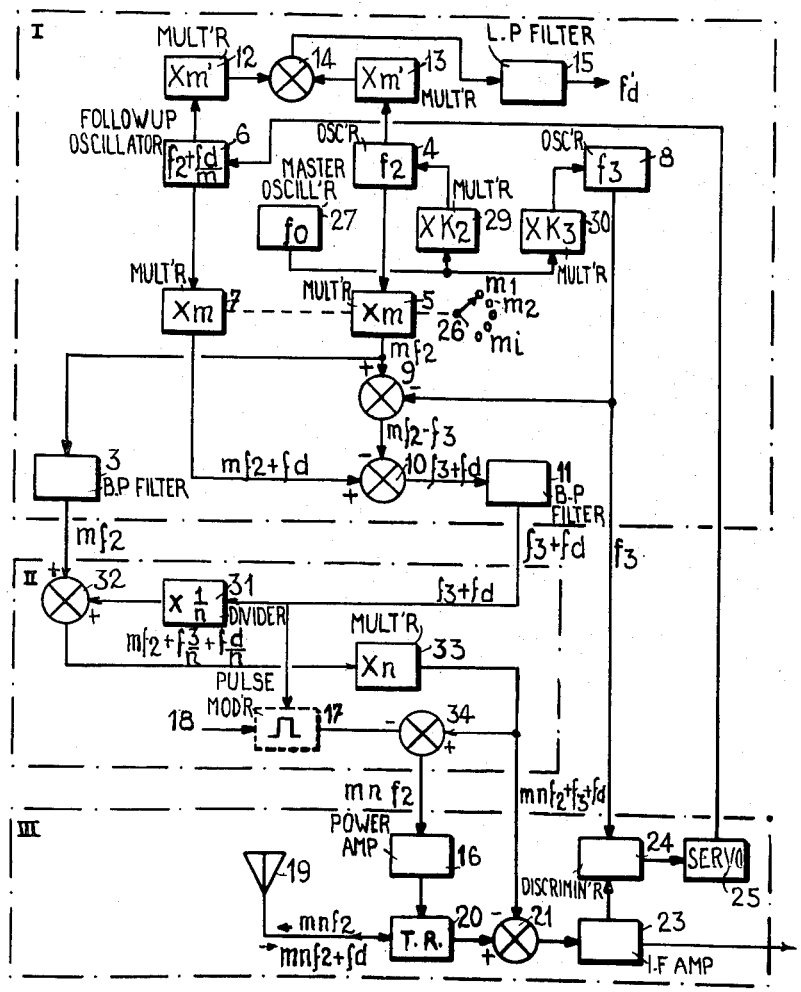

3,249,936
DOPPLER RADAR SYSTEM
Henri G. P. Forestier, Paris, France, assignor to Compagnie Francaise Thomson-Houston, Paris, France, a corporation of France
Filed June 16, 1964, Ser. No. 375,494
Claims priority, application France, July 5, 1963, 940,503
10 Claims. (Cl. 343—8)

The general purpose of this invention is to provide an improved Doppler radar system whereby the radial velocity of a moving target can be determined with higher resolution and can be exploited more effectively and conveniently than is possible with present systems.

In any Doppler radar system the radial velocity $v_r$ of a target is given by the formula $$v_r = \frac{c}{2} \frac{f_d}{f}$$

where $c$ is the velocity of electromagnetic waves, $f$ the frequency of the transmitted energy and $f_d$ the shift in received echo energy as a result of Doppler effect. From this equation it can be seen that the sensitivity or resolution of a velocity measurement is proportional to the transmission frequency $f$ since a unit change in target radial velocity produces a change in Doppler shift which is large in proportion as the transmission frequency is large. On the other hand practical considerations impose a limit on the transmission frequencies that can be used. It is one object of this invention to eliminate this limitation and to provide a Doppler system utilizing transmission frequencies in a practically acceptable range while delivering a velocity signal equivalent in resolution to what would only be attainable through the use of substantially higher transmission frequencies in conventional Doppler systems.

For optimum performance of a Doppler system, it is desirable that the transmission frequency be selectable from amongst a range of values in order to permit of using in each case the frequency most appropriate for current conditions, primarily the current range of target velocities. From the formula for $v_r$ written above it is obvious that when the transmission frequency $f$ is changed, the Doppler shift $f_d$ for a given target velocity $v_r$ changes also. In other words, the Doppler signal delivered by a conventional variable-frequency Doppler system, in order to have significance and to be usable for display and/or control purposes, generally at a remote station, must be accompanied by another signal indicative of the transmission frequency currently used. This requirement complicates installations, in that it involves supplementary signal coding, transmission and decoding means. An important object of this invention is to do away with this requirement and provide a selectable-frequency Doppler radar system which will produce an output signal having unequivocal significance as to the target velocity indicated by it, regardless of the transmission frequency selected for use in the system at any time.

A further object is to provide a Doppler system capable of developing a so-called "normalized" velocity signal proportional to target radial velocity with a relatively high proportionality factor, and independent of variations in the transmission frequency. A further object is to provide a Doppler system in which the circuits are so arranged that the low-frequency Doppler component is not present in any part of the circuits as a separate frequency signal, but appears therein substantially only in linear combinations with other and higher frequencies, and/or multiplied by a relatively large factor, while the system as a whole produces an output signal, the so-called normalized velocity signal, proportional to target radial velocity rather than merely to Doppler shift.

An important feature of the invention lies in the provision of an improved intermediate-frequency circuit in a Doppler system, including means for developing a local heterodyning signal as a linear function of transmission frequency, Doppler shift and a reference signal, whereby the resulting I.-F. signal is held, under steady-state conditions, to a value equal to the said reference frequency. The above and further objects and features of the invention will become apparent as the description proceeds with reference to the accompanying drawings, of which FIGURE 1 is a functional block diagram of a first embodiment of the improved Doppler radar system; and FIGURE 2 is a functional block diagram of a modified embodiment.

In the Doppler radar system shown in FIGURE 1, a master oscillator 27 has a stable output frequency $f_0$ which is applied in parallel to three frequency multipliers 28, 29, 30 in which the master frequency $f_0$ is multiplied by constant factors K1, K2, K3 respectively, to provide three stable frequencies $f_1$, $f_2$, $f_3$, serving to stabilize the outputs of corresponding frequency oscillators 1, 4 and 8 respectively.

The stable output frequency $f_1$ from oscillator 1 is passed through a frequency multiplier 2 in which it is multiplied by a selectable integral factor $m$. As shown the factor $m$ can be selected between a number of discrete integral values $m_1, m_2 \ldots m_i$, e.g., by means of a manual selector switch 26. The output from multiplier 2 is passed through a band pass filter 3, and the filtered frequency $mf_1$ is passed through a pulse modulator device 17 in which it is modulated by means of suitable video pulses applied to a modulating input 18. The output from modulator 17 is passed through a power amplifier 16 and then applied by way of a transmit-receive switch 20 to the antenna 19 whence the power pulses at frequency $mf_1$ are beamed at a target whose radial velocity is to be measured.

Echo signals received by antenna 19 are at the frequency $(mf_1+f_d)$, where $f_d$ represents a Doppler frequency component resulting from, and proportional to, the radial velocity of the target relative to the radar station. This received frequency is passed back through T-R switch 20 and applied to one input of a frequency-changer device 21 in which it is mixed subtractively with a heterodyning signal applied to a second input of device 21. This heterodyning signal is produced in a manner now to be described.

A variable-frequency oscillator 6, which can be termed the Doppler follow-up oscillator, is provided. Oscillator 6 has a base or mean frequency $f_2$ which is equal to the frequency of oscillator 4, and is capable of departing to either side from this mean frequency by predetermined maximum excursions as will presently appear. The output from variable oscillator 6 is passed through a frequency-multiplier 7 automatically actuated from selector 26 so as to multiply said output by the factor $m$. The output from oscillator 4 is likewise passed through a multiplier 5 actuated from selector switch 26 so as to multiply said output by the selected factor $m$ providing a frequency $mf_2$ at the output from multiplier 5. This output is mixed subtractively with the $f_3$ output from reference oscillator 8 in a mixer 9 so as to provide a difference frequency $mf_2-f_3$ and this in turn is mixed subtractively in a further mixer 10 with the output from multiplier 7 to provide a difference frequency. This is passed through a band-pass filter 11 and the filtered frequency is mixed with the frequency $mf_1$ from filter 3 produced as previously described, in a mixer 22 which is preferably a single-side-band synchrodyne circuit. The output from mixer 22 is applied as the heterodyning signal to mixer 21.

The output from heterodyne mixer 21 is passed through an intermediate-frequency amplifier 23, whose output is applied to one input of a frequency-discriminator or comparator 24. The other input to discriminator 24 is provided by the stable reference frequency $f_3$ from oscillator 8.

The voltage output from discriminator 24 is applied to a servo device 25 of any suitable type which produces an electrical or mechanical output applied to the frequency-controlling input of follow-up oscillator 6.

The system as so far described operates as follows: Assuming a steady-state condition in which the target radial velocity is unchanging, then the discriminator 24 produces an error output voltage so long as its two input frequencies are not equal. This error voltage acting by way of servo device 25 varies the output frequency of follow-up oscillator 6 and hence varies the heterodyne frequency applied to mixer 21 until the lower input to discriminator 24 has reached equality with its constant upper input, the reference frequency $f_3$. At this point discriminator 24 produces a zero error output and the servo-device 25 holds the frequency of follow-up oscillator 6 unchanging at its present value. In these conditions, that is with unchanging target velocity and after the servo-circuits have reached electrical equilibrium, it is easy to see that since the output from the heterodyning mixer 21 is $f_3$, and since its one output (from T–R switch 20) is $(mf_1+f_d)$, then its other or heterodyning input must necessarily be the sum of these values, i.e. $(mf_1+f_3+f_d)$. Considering the additive mixer 22, then it is similarly clear that its upper input (from filter 11) must be $(f_3+f_d)$ under the conditions considered. Turning to the mixer 10, it follows from the foregoing that its left-hand input (from multiplier 7) must be $(mf_2+f_d)$ in order that the steady-state equilibrium conditions assumed shall be satisfied. Hence, under these conditions, the output frequency of follow-up oscillator 6 must necessarily be $m$ times less than this last value, i.e., must have the value $$\left(f_2 + \frac{f_d}{m}\right)$$

as indicated on the drawing.

Thus, a consideration of the servo-loop traceable through the circuit components 21–23–24–25–6–7–10–11–22–21 shows that when steady-state equilibrium conditions are prevailing in the system, the variable-frequency follow-up oscillator 6 is controlled through servo-device 25 by means of the error signal from discriminator 24 so as to produce a frequency of $$\left(f_2 + \frac{f_d}{m}\right)$$

This frequency signal from oscillator 6 is now used according to the invention to produce a so-called normalized velocity signal in the following way. The output from oscillator 6 is passed through a frequency multiplier 12 in which is multiplied by a large constant factor $m'$ which may constitute a constant of the system. Similarly the output from oscillator 4 is passed through a multiplier 13 in which it is multiplied by the same factor $m'$. The outputs from both multipliers 12 and 13 are combined subtractively in a mixer 14 which thus provides an output frequency which is $$\frac{m'}{m}f_d$$

in the steady state considered. This is passed through a lowpass filter 15 and provides a frequency signal $$f'_d = \frac{m'}{m}f_d$$

which is the so-called normalized velocity signal.

It is easily shown that this normalized velocity signal $f'_d$ represents a measure of the radial velocity of the target independently of the particular value selected for the multiplier factor $m$ and hence the transmission frequency $f=mf_1$. The radial target velocity $v_r$ is given by the well-known formula $$v_r = \frac{cf_d}{2f}$$

where $c$ is the velocity of electromagnetic waves, $f_d$ the Doppler frequency component in the received echo signal and $f$ the transmission frequency. The equation can clearly be rewritten $$v_r = \frac{c}{2}\frac{1}{m'f_1}\frac{m'f_d}{m}$$

or $$v_r = \frac{c}{2m'f_1}f'_d$$

where $f'_d$ is the normalized velocity signal of the invention. In this last equation, the proportionality factor $$\frac{c}{2m'f_1}$$

depends only on the universal constant $c$ and the system constants $m'$ and $f_1$ not on the variable multiplying coefficient $m$, and hence the frequency signal $f'_d$ constitutes a true measure of the radial target velocity regardless of the particular frequency selected for transmission. Thus, should it be desired to change the frequency of transmission as for improving measuring accuracy in view of a large change in velocity of the target, the selector switch 26 is actuated to a new position whereby the transmitted frequency $mf_1$ is altered to a new value. The normalized Doppler output signal $f'_d$ from the system will still nevertheless provide a true measure of the target radial velocity for the reasons explained above.

In the modified embodiment of the invention shown in FIGURE 2, parts corresponding in function to those in FIGURE 1 have been similarly designated. The section I of the embodiment of FIGURE 2 differs from section I of FIGURE 1 in that frequency $f_1$ is here selected equal to $f_2$, whereby generator 1 as well as the frequency multipliers 2 and 28 are omitted. The multiplied frequency $mf_2$ from multiplier 5 is applied to band-pass filter 3. In section II of the system to FIGURE 2, the transmitted frequency and the local heterodyning frequency are produced in a manner somewhat different from the manner in which these frequencies are produced in section II of FIGURE 1.

Specifically, the output frequency $(f_3+f_d)$ from band-pass filter 11 is here divided by a factor $n$ which is a constant of the system, in a frequency divider 31. The divided frequency is then mixed additively with the frequency $mf_2$ from filter 3 in mixer 32 to provide the composition frequency $$\left(mf_2 + \frac{f_3}{n} + \frac{f_d}{n}\right)$$

and this is finally multiplied by $n$ in a frequency multiplier 33 to provide the local heterodyning frequency $$(mnf_2+f_3+f_d)$$

This last frequency, at the same time as it is applied to the mixer 21 to provide the received intermediate-frequency signal, is also applied to one input of a further mixer 34, such as a single side-band synchrodyne circuit, the other input of which is fed with the frequency $(f_3+f_d)$ from filter 11, after modulation with video pulses 18 in a modulator 17. The output from synchrodyne circuit 34 includes only the lower frequency side band $mnf_2$ and this is applied through amplifier 16 and T–R switch 20 to antenna 19 to serve as the transmission frequency. In this modification therefore, it is again possible to alter the transmitted frequency $f=mnf_2$ by means of the selector switch 26 which serves to alter the multiplying factor $m$ over a range of values $m_1$ through $m_i$. Again however, regardless of the selected transmission frequency $mnf_2$, the normalized velocity signal $$f'_d = \frac{m'}{m} f_d$$

produced in the same manner as in the first embodiment, will provide a true measure of the radial velocity of the target.

It will be noted that in the system of FIGURE 2, matters are so arranged that at no point of the circuits does the Doppler frequency $f_d$ appear separately.

It will be understood that in both embodiments of the invention described, there is provided a variable-frequency, so-called follow-up Doppler oscillator 6 connected in differential relation with the fixed-frequency oscillator 4 and serving as the means for completing a frequency servo-loop for the received echo energy, whereby the frequency output of said follow-up oscillator is made to differ from the constant output frequency of said fixed-frequency oscillator by an amount proportional to the Doppler component present in said received energy.

As a first advantage of this set-up, it becomes possible to compare the frequencies of both said oscillators after first multiplying the frequencies by a large, constant factor ($m'$), to produce a frequency signal which is proportional to the desired radial velocity of the target, with as high a proportionality factor as may be desired, thereby simulating so to speak a condition wherein the transmission frequency of the beamed energy would be higher than it actually is, with a corresponding increase in the degree of system resolution, while maintaining the actual transmitted frequency at a reasonable value. This is a first and extremely important result procured by the invention.

As a second and equally important beneficial result, the set-up described makes it possible to vary the transmission frequency through multiplication with a selected one out of a number of different multiplying coefficients ($m$), thereby to use the optimum transmission frequency best suited for each particular range of target velocities, without affecting the significance of the output signal, which will at all times remain a measure of the target velocity and can be used directly without requiring the transmission of an additional code signal to define the particular transmission frequency used. The advantage of this feature will also be immediately evident to those familiar with Doppler radar work.

Very conceivably, the two features just mentioned as being simultaneously attainable by means of the invention could be taken advantage of separately. Thus, referring to the first of said features, multiplication by the large factor $m'$ which is a system constant, can be used without providing means for applying a selectable multiplier factor $m$ serving to alter transmission frequency. This will provide a constant-frequency Doppler system of increased resolution over a comparable system of conventional character operating on the same transmission frequency as already explained.

Conversely, it would be feasible to apply the selectable multiplier factor $m$ to alter the transmission frequency without using the high constant multiplier $m'$ (e.g., by making $m'=1$). This makes available a variable-frequency Doppler system which is advantageously simplified over conventional such systems in that it omits the need of coding, transmitting and decoding an additional information signal to define the transmission frequency used.

It will be clear however that both advantages accruing from the use of the high system constant $m'$ on the one hand, and the selectable factor $m$ on the other hand, are preferably applied jointly, as shown in each of the embodiments disclosed, since this is very easily done without substantially complicating the system. When this is done in accordance with the preferred aspect of the invention, there is obtained as the output signal from the system, a so-called normalized velocity signal $f'_d$ which has the dual advantage of being much higher than the usual Doppler component that would otherwise be obtained with the transmission frequency used, and of being independent of such transmission frequency.

It will be noted that the normalized velocity signal obtained according to the invention is proportional to the target velocity rather than being proportional to the Doppler component. It is correct to state that in the system of the invention, the Doppler component of the echo energy, while of course present in the system circuits, is present there merely as an intermediary but is not actually manifest as a separate entity at any point of said circuits. What is made manifest, according to the invention, is the so-called normalized velocity signal $f'_d$ not the Doppler component $f_d$.

An important consequence of the features described is the less stringent requirement on frequency stability for the fixed oscillators used in the system of the invention as compared to conventional Doppler radar requirements. All of the original frequencies present, including both the transmission frequencies, (proportional to $f_1$, FIGURE 1, or $f_2$, FIGURE 2), and the reference frequencies, are eliminated from the servo-loops of the invention, and minor fluctuations therein do not reflect on the accuracy of the output signal, the normalized velocity signal $f'_d$ under steady-state conditions.

What I claim is:

1. A Doppler radar system comprising a first oscillator for producing a constant frequency; a second oscillator for producing a variable frequency having as a mean value that of said constant frequency; means for producing a transmission frequency in predetermined relation with said constant frequency; means for beaming said transmission frequency at a moving target and means for receiving reflected energy from the target which reflected energy includes a Doppler component proportional to the radial velocity of the target; means for producing a reference frequency; servo-loop means including means for comparing the frequency of the reflected energy with the reference frequency whereby to produce an error signal and means for applying said error signal to said second oscillator to vary the frequency thereof until said error signal is substantially zero; and mixer means connected to both said first and second oscillators for producing a differential output signal frequency, whereby said output signal frequency is a measure of said radial velocity regardless of variations in said transmission frequency.

2. A Doppler radar system comprising a first oscillator for producing a constant frequency; a second oscillator for producing a variable frequency having as a mean value that of said constant frequency; means for producing a transmission frequency in predetermined relation with said constant frequency; means for beaming said transmission frequency at a moving target and means for receiving reflected energy from the target which reflected energy includes a Doppler component proportional to the radial velocity of the target; means for producing a reference frequency; servo-loop means including means for comparing the frequency of the reflected energy with the reference frequency whereby to produce an error signal and means for applying said error signal to said second oscillator to vary the frequency thereof until said error signal is substantially zero; respective frequency multipliers connected to the outputs of said first and second oscillators for multiplying both said constant and said variable frequencies by a common, large factor; and mixer means connected to said respective multipliers for producing a differential output signal frequency, which will be a measure of said radial velocity regardless of variations in said transmission frequency.

3. A Doppler radar system comprising a first oscillator for producing a constant frequency; a second oscillator for producing a variable frequency having as a mean value that of said constant frequency; means for producing a transmission frequency in predetermined relation with said constant frequency; means for beaming said transmission frequency at a moving target and means for receiving reflected energy from the target which reflected energy includes a Doppler component proportional to the radial velocity of the target; means for producing a reference frequency; servo-loop means including means for comparing the frequency of the reflected energy with the reference frequency whereby to produce an error signal and means for applying said error signal to said second oscillator to vary the frequency thereof until said error signal is substantially zero; mixer means connected to both said first and second oscillators for producing a differential output frequency; frequency multiplier circuitry connected for altering said transmission frequency by a selected multiplying factor, frequency multiplier circuitry connected for multiplying the output frequency from each of said first and second oscillators by said selected factor, and a selector switch connected to said multiplier circuitry and operable for selecting said common multiplying factor; whereby said output signal frequency is a measure of said radial velocity regardless of alterations in said transmission frequency.

4. A Doppler radar system comprising a first oscillator for producing a constant frequency; a second oscillator for producing a variable frequency having as a mean value that of said constant frequency; means for producing a transmission frequency in predetermined relation with said constant frequency; means for beaming said transmission frequency at a moving target and means for receiving reflected energy from the target which reflected energy includes a Doppler component proportional to the radial velocity of the target; means for producing a reference frequency; servo-loop means including means for comparing the frequency of the reflected energy with the reference frequency whereby to produce an error signal and means for applying said error signal to said second oscillator to vary the frequency thereof until said error signal is substantially zero; respective frequency multipliers connected to the outputs of said first and second oscillators for multiplying both said constant and said variable frequencies by a common, large, factor; mixer means connected to the outputs of said respective multipliers for producing a differential output frequency; frequency multiplier circuit connected for altering said transmission frequency by a selected multiplying factor, frequency multiplier circuitry connected for multiplying the output frequency from each of said first and second oscillators by said selected factor, and a selector switch connected to said multiplier circuitry and operable for selecting said common multiplying factor; whereby said output signal frequency is a measure of said radial velocity regardless of alterations in said transmission frequency.

5. The system defined in claim 1, including a heterodyne mixer having a first input connected to receive said reflected energy, a second input for a heterodyne signal, and an output connected to said comparing means, and means connected to said transmission frequency-producing means, said first and second oscillators and said reference frequency producing means, for combining the outputs thereof into a heterodyne signal which is equal under steady-state conditions to the sum of the reflected energy frequency and the reference frequency, and means applying said heterodyne signal to the second input of said heterodyne mixer.

6. The system defined in claim 1, wherein the transmission frequency producing means includes a further oscillator.

7. The system defined in claim 1, wherein the transmission frequency producing means includes said first oscillator.

8. The system defined in claim 3, wherein the transmission frequency producing means includes said first oscillator, and means are provided for multiplying the frequency of said first oscillator both by said selected multiplying factor and by another constant factor to provide said transmission frequency.

9. The system defined in claim 4, wherein the arrangement of the circuits is such that said Doppler component is present at no point of the circuits as a separate frequency signal unless in linear combination with other frequencies or multiplied by a relatively large factor.

10. A Doppler radar system comprising means for beaming radio energy at a moving target; means for receiving reflected energy from the target; means for deriving a Doppler frequency component from the reflected energy which is a function of target radial velocity and of the frequency of the transmitted energy; means for altering the frequency of the transmitted energy by a selected factor; and means for altering the derived Doppler component by a corresponding factor to produce a normalized velocity signal which will represent a measure of target radial velocity regardless of the selected factor.

No references cited.

LEWIS H. MYERS, *Primary Examiner.*

CHESTER L. JUSTUS, *Examiner.*

R. D. BENNETT, *Assistant Examiner.*